United States Patent
Rittman et al.

(10) Patent No.: US 11,741,284 B2
(45) Date of Patent: Aug. 29, 2023

(54) SYSTEMS AND METHODS OF AUTOMATIC GENERATION OF INTEGRATED CIRCUIT IP BLOCKS

(71) Applicant: GBT Technologies Inc., Santa Monica, CA (US)

(72) Inventors: Danny Rittman, Oceanside, CA (US); Mo Jacob, Beverly Hills, CA (US)

(73) Assignee: GBT Technologies, Inc., Santa Monica, CA (US)

(*) Notice: Subject to any disclaimer, the term of this patent is extended or adjusted under 35 U.S.C. 154(b) by 0 days.

(21) Appl. No.: 17/953,378

(22) Filed: Sep. 27, 2022

(65) Prior Publication Data

US 2023/0097030 A1    Mar. 30, 2023

Related U.S. Application Data (60) Provisional application No. 63/249,150, filed on Sep. 28, 2021.

(51) Int. Cl.
*G06F 30/39* (2020.01)
*G06F 30/20* (2020.01)
(Continued)

(52) U.S. Cl.
CPC ............ *G06F 30/39* (2020.01); *G06F 30/17* (2020.01); *G06F 30/20* (2020.01); *G06F 30/27* (2020.01);
(Continued)

(58) Field of Classification Search
CPC .......... G06F 30/39; G06F 30/20; G06F 30/27; G06F 30/17; G06F 30/398; G06F 2115/08
(Continued)

(56) References Cited

U.S. PATENT DOCUMENTS 5,541,025 A   7/1996   Oi et al.
5,761,075 A   6/1998   Oi et al.
(Continued)

FOREIGN PATENT DOCUMENTS

JP     5839379 B1 *  1/2016  ............ G06F 30/30

OTHER PUBLICATIONS

Synopsys.Inc., "Synopsys coreTools: IP Based Design and Verification", https://www.synopsys.com/dw/doc.php/ds/o/coretools_ds.pdf, 2008, pp. 1-3. (Year: 2008).*
(Continued)

*Primary Examiner* — Phallaka Kik
(74) *Attorney, Agent, or Firm* — Eric L. Lane; Green Patent Law (57) ABSTRACT

Computer-implemented systems and methods for automatically generating an electronic circuit IP block are provided. The disclosed systems and methods maintain the process design rules (DRC Clean), connectivity (LVS Clean) correctness, and obey Reliability Verification (RV) and DFM (Design for Manufacturability) constraints, including time constraints. Exemplary systems and methods may include an electronic circuit layout generator and/or IP generator to obtain manufacturing processes and design rules from an external source, define a type of electronic circuit to be fabricated, prepare a circuit schematic of the defined electronic circuit, and generate an IP block for the defined electronic circuit based on the circuit schematic. A computer program generator is provided to create the defined electronic circuit. A computer readable storage medium contains processing instructions for obtaining the manufacturing processes and design rules and for fabricating the electronic circuit.

20 Claims, 9 Drawing Sheets

(51) Int. Cl.
  *G06F 30/27* (2020.01)
  *G06F 30/398* (2020.01)
  *G06F 30/17* (2020.01)
  *G06F 115/08* (2020.01)

(52) U.S. Cl.
  CPC ........ *G06F 30/398* (2020.01); *G06F 2115/08* (2020.01)

(58) Field of Classification Search
  USPC .................... 716/110, 139, 138; 703/14
  See application file for complete search history.

(56) References Cited

U.S. PATENT DOCUMENTS

| | | | |
|---|---|---|---|
| 6,081,910 A * | 6/2000 | Mifsud | G11C 29/44 714/724 |
| 6,457,163 B1 | 9/2002 | Yang | |
| 6,782,517 B2 | 8/2004 | Rittman et al. | |
| 6,782,524 B2 | 8/2004 | Rittman | |
| 6,862,723 B1 * | 3/2005 | Wang | G06F 30/367 716/112 |
| 6,904,582 B1 | 6/2005 | Rittman et al. | |
| 6,978,437 B1 | 12/2005 | Rittman et al. | |
| 7,178,114 B2 | 2/2007 | Lin et al. | |
| 7,519,940 B2 | 4/2009 | Huang et al. | |
| 7,537,864 B2 | 5/2009 | Fujimoto et al. | |
| 7,568,174 B2 | 7/2009 | Sezginer et al. | |
| 7,600,212 B2 | 10/2009 | Zach et al. | |
| 7,849,423 B1 | 12/2010 | Yenikaya et al. | |
| 7,984,412 B1 * | 7/2011 | Schumacher | G06F 30/34 716/108 |
| 8,572,517 B2 | 10/2013 | Pramanik et al. | |
| 8,940,462 B2 | 1/2015 | Hashimoto et al. | |
| 9,292,627 B2 | 3/2016 | Pramanik et al. | |
| 9,372,855 B1 | 6/2016 | Lee et al. | |
| 9,836,556 B2 | 12/2017 | Lei et al. | |
| 9,847,783 B1 * | 12/2017 | Teh | H03K 19/17736 |
| 10,755,026 B1 | 8/2020 | Luo | |
| 10,922,462 B1 * | 2/2021 | Chen | G06F 30/30 |
| 11,443,089 B1 * | 9/2022 | Geogdjaev | G06F 30/3315 |
| 2002/0144230 A1 | 10/2002 | Rittman | |
| 2002/0152453 A1 | 10/2002 | Rittman | |
| 2002/0166109 A1 | 11/2002 | Rittman et al. | |
| 2003/0135834 A1 * | 7/2003 | Tojima | G06F 30/30 716/113 |
| 2005/0005256 A1 | 1/2005 | Rittman | |
| 2005/0022151 A1 | 1/2005 | Rittman et al. | |
| 2005/0142454 A1 | 6/2005 | Fujimoto et al. | |
| 2007/0289207 A1 | 12/2007 | May | |
| 2008/0115102 A1 | 5/2008 | Rittman | |
| 2008/0134129 A1 | 6/2008 | Vickery | |
| 2008/0216026 A1 * | 9/2008 | Gotou | G06F 30/39 716/132 |
| 2009/0300568 A1 * | 12/2009 | Kuroda | G06F 30/30 716/122 |
| 2011/0023000 A1 * | 1/2011 | Dirks | G06F 30/392 716/122 |
| 2011/0229807 A1 | 9/2011 | Hashimoto et al. | |
| 2011/0296364 A1 * | 12/2011 | Chen | H01L 27/0207 716/122 |
| 2018/0040082 A1 * | 2/2018 | Hayashi | G06F 30/33 |
| 2021/0012054 A1 | 1/2021 | Adler | |
| 2021/0067483 A1 * | 3/2021 | Kurokawa | H04L 61/5046 |
| 2021/0182462 A1 * | 6/2021 | Han | G06F 13/12 |
| 2022/0050493 A1 * | 2/2022 | Lee | G06F 1/324 |
| 2022/0092248 A1 * | 3/2022 | Chuang | G06F 30/392 |
| 2022/0405454 A1 * | 12/2022 | Kalyanasundaram | G06F 30/367 |
| 2023/0042307 A1 * | 2/2023 | Milton | H04L 61/5061 |

OTHER PUBLICATIONS

Tuomi, "The Future of Semiconductor Intellectual Property Architectural Blocks in Europe", JRC European Commision, 2009, 142 pages. (Year: 2009).*
Cui et al., Chinese Patent Document No. CN-210743157-U, published Jun. 12, 2020, abstract and 1 drawing. (Year: 2020).*
U.S. Appl. No. 17/315,747, Rittman et al.
U.S. Appl. No. 17/391,292, Rittman et al.
U.S. Appl. No. 17/880,055, Rittman et al.

* cited by examiner

SYSTEMS AND METHODS OF AUTOMATIC GENERATION OF INTEGRATED CIRCUIT IP BLOCKS

CROSS-REFERENCE TO RELATED APPLICATION

This application is a non-provisional of and claims priority to U.S. patent application Ser. No. 63/249,150, filed Sep. 28, 2021, which is hereby incorporated by reference herein in its entirety.

FIELD

The present disclosure relates to the field of integrated circuits (ICs), and more particularly, to systems and methods of automatic generation of integrated circuit intellectual property (IP) blocks.

BACKGROUND

A typical IC includes a semiconductor substrate doped in a desired pattern and several layers of insulating and conductive materials sequentially formed above the substrate. The doping patterns in the substrate and the layer patterns define structures of IC devices such as gates, transistors, and passive devices (inductors, capacitors and resistors), along with the conductive networks that interconnect the IC devices.

For custom, intellectual property (IP) layout designs, designers design the electronic circuit first and then the layout design phase starts. Typically, designers use parameterized cells (PCells) as building blocks. Traditionally, PCells are defined in scripting languages, of which some are proprietary, such as the Cadence SKILL language, and some are in the public domain, such as TCL or Python. To instantiate a script-based PCell in a layout, the designer needs to specify the PCell name and give a list of values for the parameters. The system then realizes the layout for the PCell instance by executing the corresponding script with the parameter values provided by the designer. Although script based PCells provide a flexible way of generating device layouts, the programming effort for the scripts is huge, and the subsequent maintenance of the scripts is difficult and complicated.

In addition, most of the IP is designed manually using experienced mask designers because the layout is mostly analog or mixed signal type. Ultimately, a complete design of an IP block from architecture to complete, verified layout may take a few months and sometimes up to twelve or eighteen months to complete.

An automatic IP layout generator can be provided for time reduction for designing complete IP blocks. For built-in device generators, a predefined set of elements can be programmed in the layout tool in advance, and the designer can select specific elements, wherein the corresponding layouts can be automatically generated by the built-in device generator. It is noted that the designer only needs to prepare and maintain design rules for the built-in device generator in layout tools. The built-in device generator is easy to use by the designer since no scripting or template designing is needed.

Unfortunately, the predefined elements in existing built-in device generators typically are limited to specific layout patterns. For new design rules/layout patterns which are not currently supported in a built-in device generator, the designer can do nothing but to wait since the device generator is provided by the tool vendor and is purely a black box to the designer. This limitation can be alleviated if the built-in device generation is augmented with the power and flexibility of scripting as found in script based PCells.

There are existing methods of embedding a script in a template-based IC layout generator. However, the script typically is tailored to the template-based generation approach. It does not offer full-blown scripting capability such as querying and editing. Moreover, it lacks the capability of modifying parameter values and requesting for a re-generation.

Accordingly, there is a need for a system and method that automatically generates IP blocks. There is also a need for a system and method that allows designers to modify the circuit schematic or the electrical constraints. There is a need for a system and method of IP block generation that makes programming and maintenance more efficient.

SUMMARY

The present disclosure, in its many embodiments, alleviates to a great extent the disadvantages and problems associated with creating IP layout designs by providing computer-implemented systems and methods for automatic generation of an electronic circuit IP block by obtaining manufacturing processes and design rules from an external source, defining an electronic circuit to be fabricated, preparing a circuit schematic of the defined electronic circuit, and generating an IP block for the defined electronic circuit based on the circuit schematic. The present disclosure relates generally to a method and system for generating design layouts of integrated circuits (ICs), and more particularly to methods for automatically generating Intellectual Property (IP) layouts from circuit schematic by circuit type. The generated IP layout is produced LVS, DRC clean. The circuit's generated layout complies with DFM and electrical information and constraints, including timing constraints.

Disclosed embodiments provide complete IP block layout automatic generation based on a given circuit's schematic. Designers can modify the schematic and add/modify electrical constraints to achieve desired performance from the electrical circuit. The system modifies the circuit's physical parameter values and re-generates the IP layout block, enabling the IP layout generator to be easily extended or modified, and offers ease of use with great flexibility for layout design.

Exemplary computer-implemented methods of automatically generating an electronic circuit IP block comprise obtaining manufacturing processes and design rules from an external source, defining an electronic circuit to be fabricated, preparing a circuit schematic of the defined electronic circuit, and generating an IP block for the defined electronic circuit based on the circuit schematic. The circuit schematic contains electrical information and constraints corresponding to the defined electronic circuit, and the IP block is compliant with the manufacturing processes and design rules. In exemplary embodiments, the external source is a netlist or external constraints file.

Exemplary methods further comprise providing an option to modify the IP block and may include executing one or more modifications to the defined electronic circuit and modifying the IP block according to the one or more modifications. The IP block may be generated from register-transfer level and/or hardware description language data. Exemplary methods further comprise validating the IP block. The defined electronic circuit may be an existing electronic circuit or a new electronic circuit. Exemplary methods for automatic generation of IP layouts are in the form of a program code embodied in a tangible medium. When the program code is loaded into and interpreted or executed by a machine, the machine becomes an apparatus for practicing the disclosed methods.

In exemplary embodiments, a computer-implemented system for automatic generation of an electronic circuit IP block comprises an electronic circuit layout generator in communication with one or more external sources and a computer program generator in communication with the electronic circuit layout generator. The electronic circuit layout generator receives from the external sources manufacturing processes, design rules, electrical connectivity information and constraints (which may include timing constraints), and a circuit schematic of a defined electronic circuit to be fabricated. The electronic circuit layout generator generates an IP block for the defined electronic circuit based on the circuit schematic. The IP block is compliant with the manufacturing processes, design rules, and electrical connectivity information and constraints. The computer program generator creates the defined electronic circuit.

Exemplary systems further comprise an artificial intelligence unit so the electronic circuit layout generator can use machine learning to generate the IP block. The electronic circuit layout generator can also use machine learning to supervise electrical connectivity correctness of the IP block. In exemplary embodiments, the defined electronic circuit is one or more of: LVS clean, DRC clean, DFM compliant, and RV compliant. The one or more external sources may comprise a netlist or external constraints file. In exemplary embodiments, the electronic circuit layout generator generates the IP block from register-transfer level and/or hardware description language data.

Exemplary computer-implemented systems for generating an electronic circuit IP block comprise a processor and a computer-readable storage medium in communication with the processor. The computer readable storage medium contains processing instructions that provide for selection of manufacturing processes, design rules, electrical connectivity information and constraints, and a circuit schematic of a defined electronic circuit to be fabricated. The processing instructions also provide for generation of an IP block for the defined electronic circuit based on the circuit schematic. The IP block is compliant with the manufacturing processes, design rules, and electrical connectivity information and constraints, include timing constraints.

Exemplary systems may further comprise an electronic circuit layout generator and/or an IP generator in communication with the processor and one or more external sources and a computer program generator in communication with the electronic circuit layout generator. The electronic circuit layout generator and/or IP generator generates an IP block for the defined electronic circuit based on the circuit schematic, and the computer program generator creates the defined electronic circuit. The electronic circuit layout generator and/or IP generator can generate the IP block to accommodate a PINS floorplan. The electronic circuit layout generator and/or IP generator can generate the IP block by flat and/or hierarchical design.

In exemplary embodiments, the processing instructions provide for modification or re-creation of electronic circuit layout based on a circuit schematic or circuit architecture modifications provided to the system by a user. Exemplary systems may further comprise an artificial intelligence unit so the electronic circuit layout generator can use machine learning to generate the IP block. In exemplary embodiments, the electronic circuit layout generator can operate in an engineering change order mode to accommodate interactive circuit changes during generation of the IP block.

Accordingly, it is seen that systems and methods of automatically generating IP blocks are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which may not be drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures may not show every piece of equipment, nor the materials, configurations, and directions of the various circuits and communications systems.

Exemplary embodiments include computer-implemented systems and methods for automatic generation of intellectual property (IP) layout blocks using computer software, according to the process design rules and circuit type. The IP blocks are generated LVS, DRC clean and in compliance with Reliability Verification (RV) and Design for Manufacturing (DFM) constraints. Disclosed embodiments may work in conjunction with and/or incorporate some of the systems, methods, and features described in co-pending U.S. patent application Ser. No. 17/880,055, filed Aug. 3, 2022, U.S. patent application Ser. No. 17/391,292, filed Aug. 2, 2021, and/or U.S. patent application Ser. No. 17/315,747, filed May 10, 2021, each of which is hereby incorporated by reference in its entirety.

At a high level, disclosed systems and methods generally operate as follows. First, manufacturing process and design rules corresponding to a specific technology are received. Second, the user defines or creates a specific type of electronic circuit to generate. This may be done using a high-level hardware descriptive language like HDL/VHDL. Third, the circuit's electrical information and constraints are provided. The constraints typically include timing constraints and other electrical constraints. Fourth, the required electronic circuit physical layout is automatically generated, in compliance with the provided electrical information, DRC, LVS and RV, DFM constraints.

Disclosed systems 2 may include a processor, a computer-readable storage medium, an electronic circuit layout generator, an IP generator, a computer program generator, and an artificial intelligence unit, and the methods 1 and systems 2 execute via computer program processing instructions. Exemplary systems take a high-level, electrical descriptive language such as VHDL/HDL and generate the circuits. Then, from the circuits, the system generates the layout.

Figure 1:
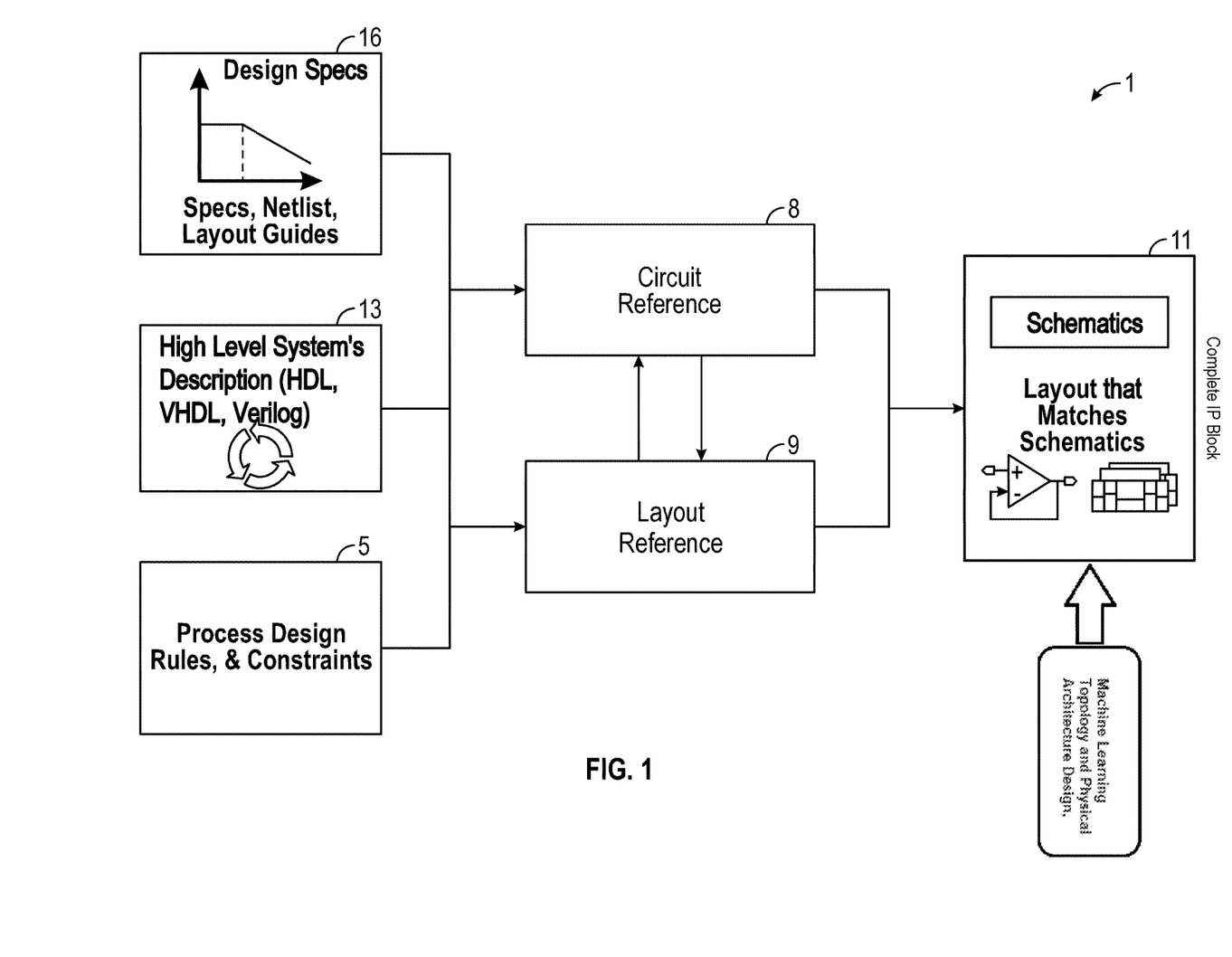
FIG. 1 is a flow chart of an exemplary embodiment of a method of automatically generating an IP block in accordance with the present disclosure.
Figure 2:
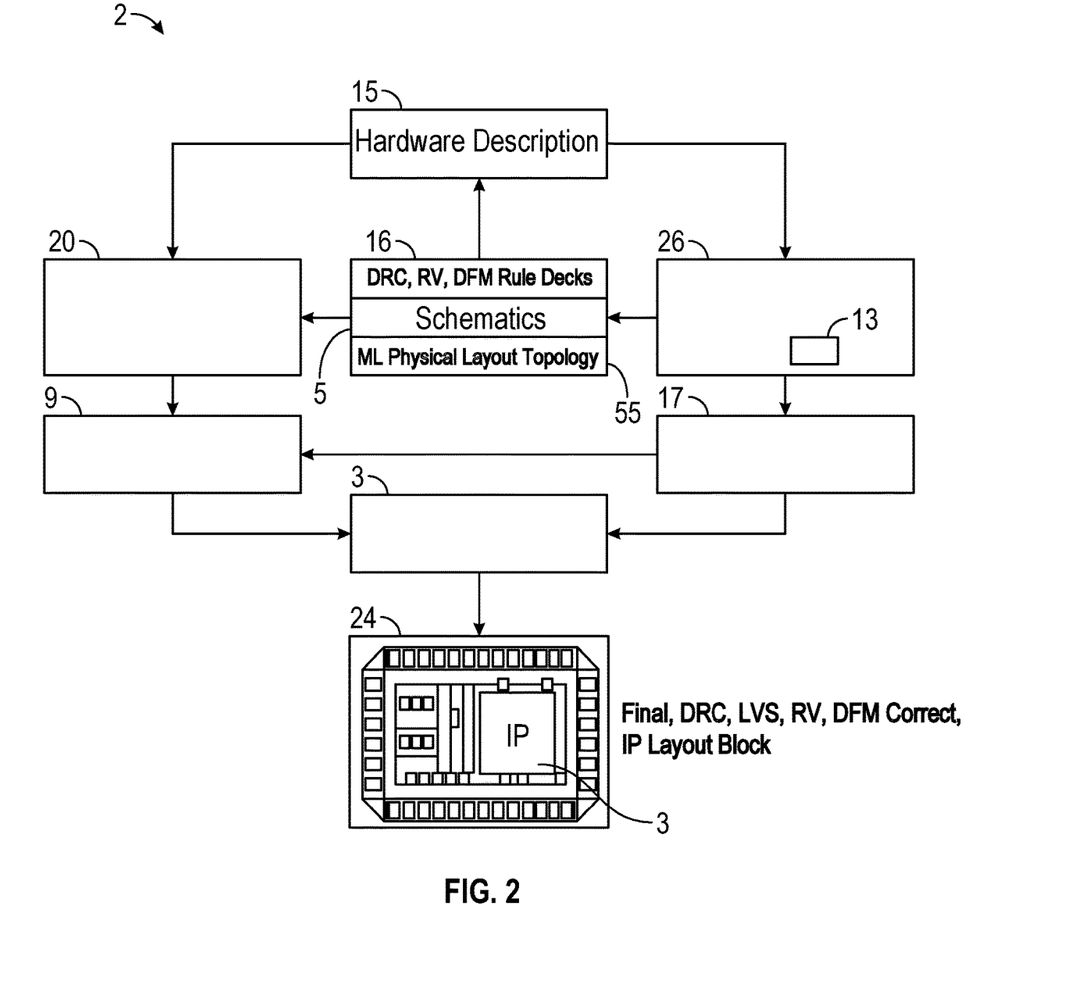
FIG. 2 is a diagram of an exemplary embodiment of a system of automatically generating an IP block in accordance with the present disclosure.
Figure 3:
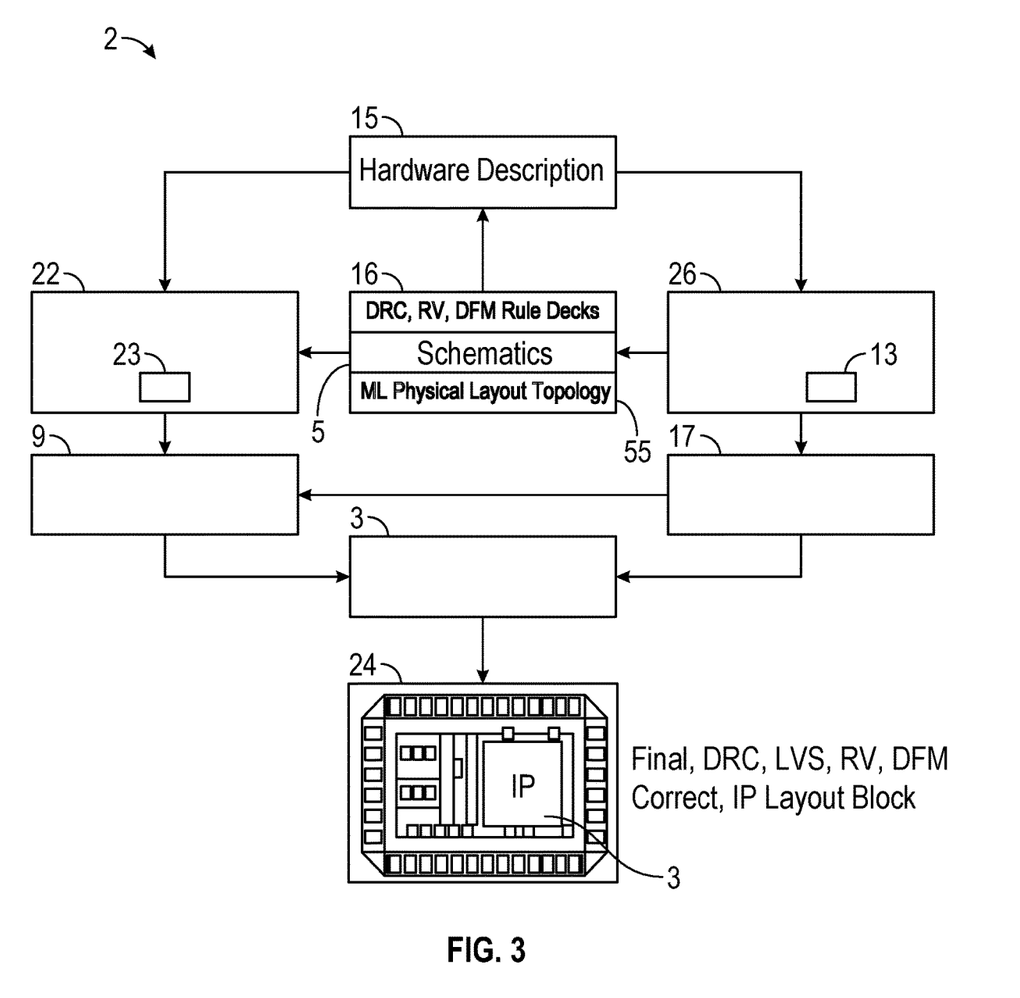
FIG. 3 is a diagram of an exemplary embodiment of a system of automatically generating an IP block in accordance with the present disclosure.

Referring to FIGS. 1-3, exemplary methods and systems for generating IP blocks 3 will now be described. An exemplary method 1 for generating an IP block 3 of an electronic circuit 10 starts by selecting a manufacturing process and matching design rules and constraints 5. These may be obtained from an external source 16 such as a netlist or external constraints file. Next, at least one type of electronic circuit 10 for fabrication is defined from existing electronic circuits in a circuit reference 8 or is created from scratch. Exemplary systems and methods enable selection of an existing circuit or designing a new one from scratch to generate an IP block automatically.

At this point, the electrical information and constraints associated with the defined or created electronic circuit 10 are defined in compliance with the DRC, LVS and RV, DFM, and constraints 5, including timing constraints. As discussed in more detail herein, the electrical information, constraints 5, and guidelines 55 may be part of a circuit schematic 18 generated for the defined electronic circuit 10. A plurality of electrical information and constraints are executed to comply with the circuit's schematic 18, electrical characteristics, and constraints so the layout matches 11 the schematics. As discussed in more detail herein, machine learning can be incorporated and utilized in several aspects of disclosed methods, including to ensure that the topology and physical architecture design of the layout matches 11 the schematics. Then the IP block 3 is automatically generated in accordance with the electrical information and constraints and design rules and in compliance with the DRC, LVS and RV, DFM constraints.

In exemplary embodiments, as shown in FIG. 2, an option to modify 9 the electronic circuit 10 is enabled as the computer program 15 is executed to modify the IP block/layout 3 and cause an IP generator 20 to generate an updated IP block/layout 3 by referencing the modified schematic and electrical constraints. The IP generator 20 executes a plurality of circuit modifications 9 to be included in the new or modified IP layout. The user can interactively modify the circuit's specifications and/or electrical constraints. The computer program 15 then modifies or re-creates the IP circuit layout, generating an updated or new IP layout according to the user's modifications. The modified IP layout is generated LVS, DRC, RV and DFM clean and correct. The circuit layout may be validated 17 against the circuit's schematic 18 to ensure that it is LVS, DRC, and DFM clean and compliant. Advantageously, disclosed systems and methods support layout styles of Digital, Analog, RF, MIXED, Memory, and MEMS.

Referring to FIG. 3, an electrical circuit layout generator 22 may be provided to generate the circuit's layout. This enables disclosed systems and methods to convert a circuit schematic into a full circuit layout block 24. An exemplary electrical circuit layout generator 22 is configured to receive a selection of a plurality of design and DFM rules along with electrical connectivity information and constraints for the electronic circuit. It also receives a schematic 18 for a certain type of electrical circuit 10 and automatically generates the circuit's layout 24 in the desired manufacturing process based on the schematic and in compliance with the process design and DFM rules.

The electrical circuit layout generator 22 may comprise a computer program generator 23 to automatically create the desired circuit, LVS, DRC, RV, and DFM clean and complying with the electrical rules and constraints. Exemplary embodiments support given input/output PINS floorplan and automatically generate the IP block 3 to accommodate this floorplan. Disclosed systems and methods also support flat and/or hierarchical design and can automatically generate flat or hierarchical IP layout design structures.

Advantageously, the electrical circuit layout generator 22 can generate the IP block 3 from a number of different data types. For instance, the IP block 3 can be automatically generated from register-transfer level (RTL), a design abstraction which models a synchronous digital circuit in terms of the flow of digital signals (data) between hardware registers and the logical operations performed on those signals. Alternatively, the IP block 3 can be automatically generated from onVerilog data, which is a hardware description language (HDL) used to describe the structure and behavior of electronic circuits model electronic systems. The IP block 3 can be automatically generated from HDL data. Disclosed systems and methods could use computational geometry private derivative Scan-Line processes to create the layout device construction and routing.

As shown in FIGS. 2 and 3, exemplary embodiments incorporate an artificial intelligence unit 26 so that machine learning 13 can be used to improve certain functionalities. The machine learning and computational geometry processes address the high level of complexity of automatically generating IP layout blocks. In general, the IP generator 20 and/or electronic circuit layout generator 22 may use machine learning to generate the IP block 3. As part of that process, the IP generator 20 and/or electronic circuit layout generator 22 may use machine learning to supervise electrical connectivity correctness of the IP block 3. Embodiments may use machine learning processes to supervise design rule correctness during construction of the IP block 3. The IP generator 20 and/or electronic circuit layout generator 22 may use machine learning to generate IP layout complying with the manufacturing design rules, RV, and DFM constraints. Advantageously, machine learning processes may be used to create the densest possible IP block 3, with consideration of given constraints.

Figure 4:
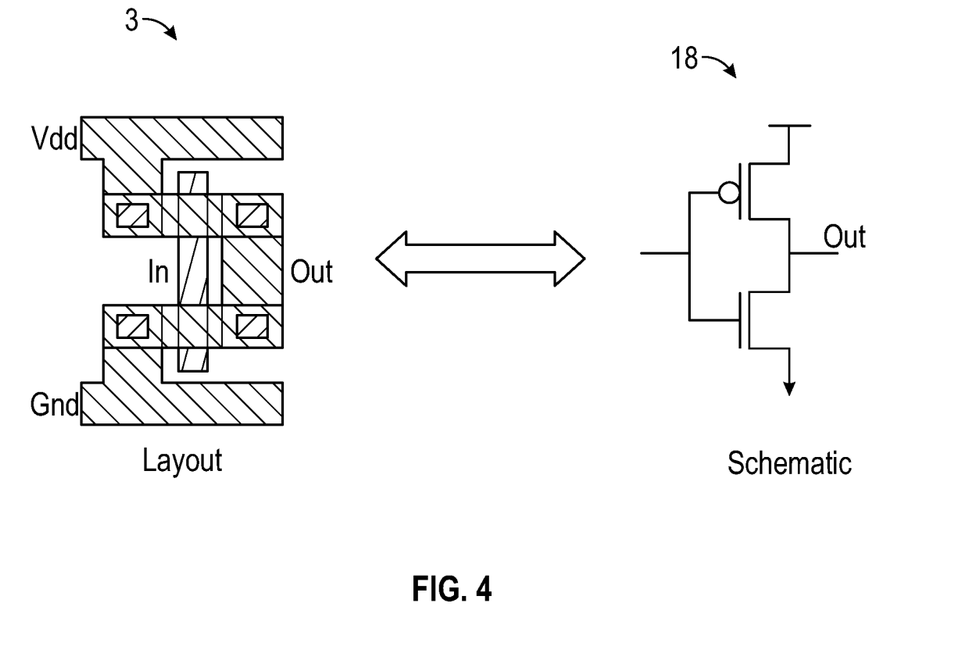
FIG. 4 is a schematic of an exemplary embodiment of a system of automatically generating an IP block in accordance with the present disclosure used to generate an IP block for a basic inverter cell.
Figure 5A:
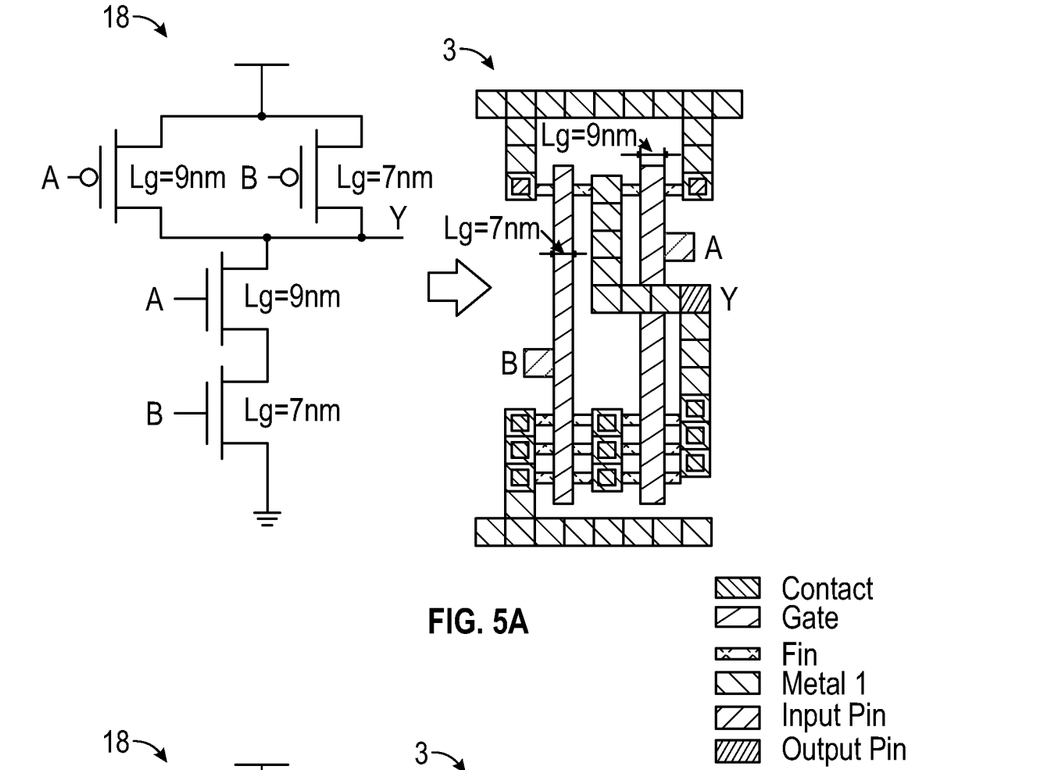
FIG. 5A is a schematic of an exemplary embodiment of a system of automatically generating an IP block in accordance with the present disclosure used to generate an IP block for a basic NAND cell.
Figure 5B:
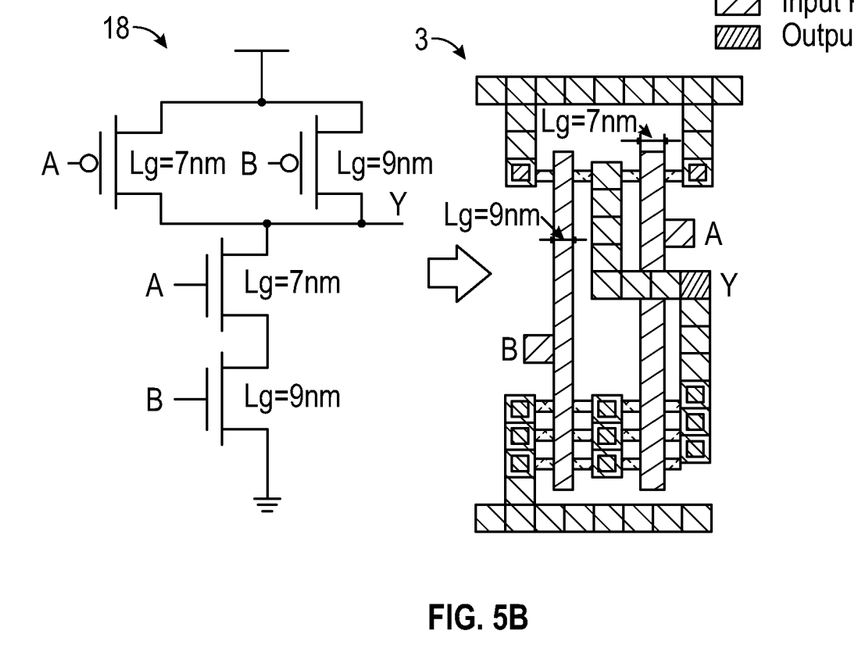
FIG. 5B is a schematic of an exemplary embodiment of a system of automatically generating an IP block in accordance with the present disclosure used to generate an IP block for a basic NAND cell.
Figure 6:
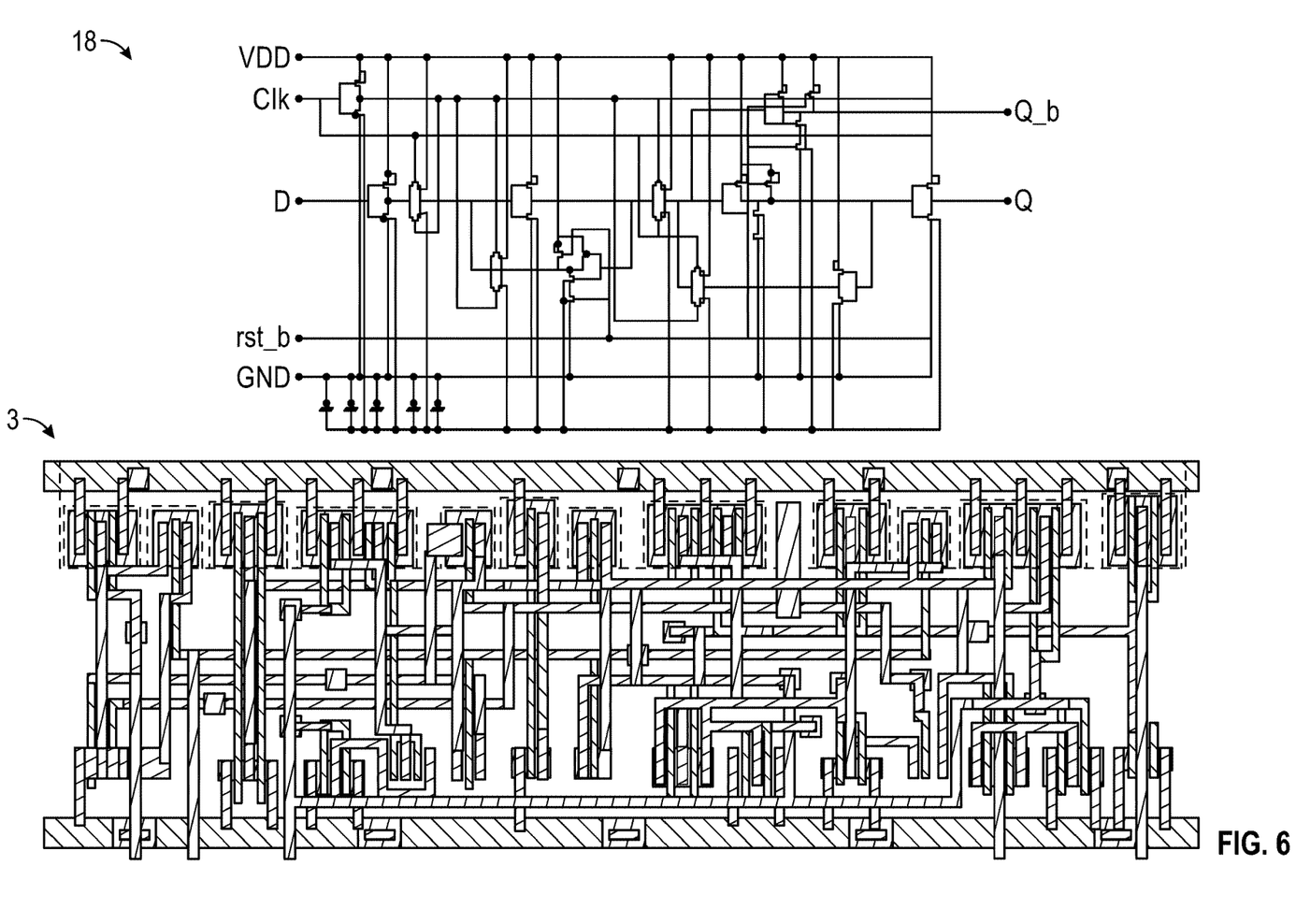
FIG. 6 is a schematic of an exemplary embodiment of a system of automatically generating an IP block in accordance with the present disclosure used to generate an IP block for a standard Flip-Flop cell.
Figure 7:
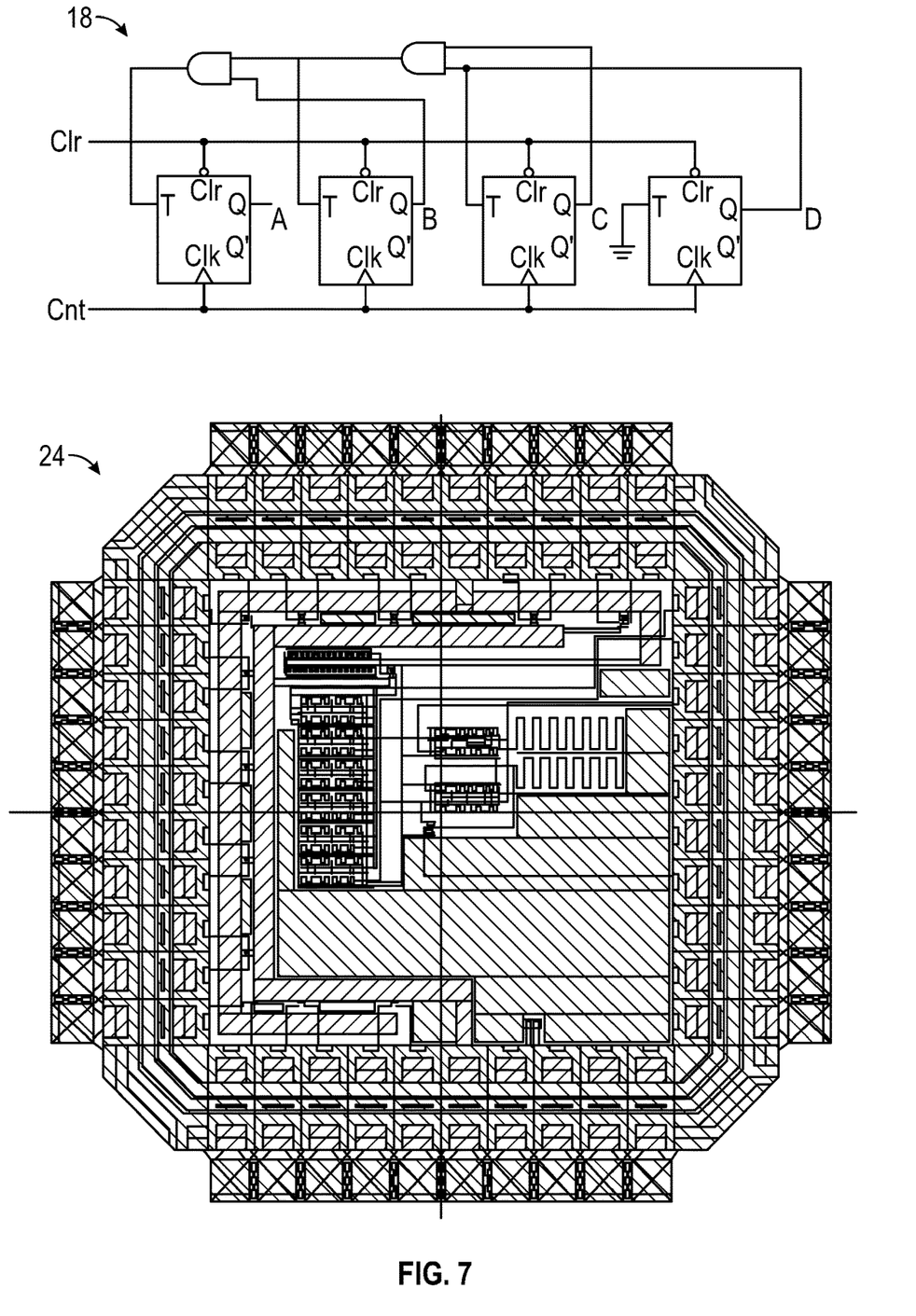
FIG. 7 is a schematic of an exemplary embodiment of a system of automatically generating a full circuit block in accordance with the present disclosure used to generate a full circuit layout block.

In operation, exemplary methods are carried out by instructions in a computer-readable storage medium, which instructs a computer to execute steps in methods of automatically generating an electronic circuit IP block 3. Design rules corresponding to a specific technology are selected, either automatically or by the user, and received by the system. More particularly, a circuit type and its design rules are selected. A circuit schematic 18 for that circuit is prepared from the IP block 3. This is illustrated for various types of cells in FIG. 4 (basic inverter cell), FIGS. 5A and 5B (basic NAND cell), and FIG. 6 (Flip-Flop standard cell). As mentioned above, computer software may be invoked to generate the circuit's layout. Advantageously, the circuit's layout is automatically generated in compliance with the process design and manufacturing rules. The methods described convert a full circuit schematic into a full circuit layout block 24, as best seen in FIG. 7.

The user or designer may modify the electrical circuit 10 and add or remove electrical characteristics and/or constraints. In exemplary embodiments, the circuit layout corresponding to its modified schematic is updated by the IP generator 20 by referencing the new circuit's characteristics and electrical constraints and the design rules. The modified electrical characteristics or constraints are defined and may be defined in a computer program so the new circuit layout can be modified or re-created based on the user's schematic and/or the circuit's architectural modifications.

Figure 8:
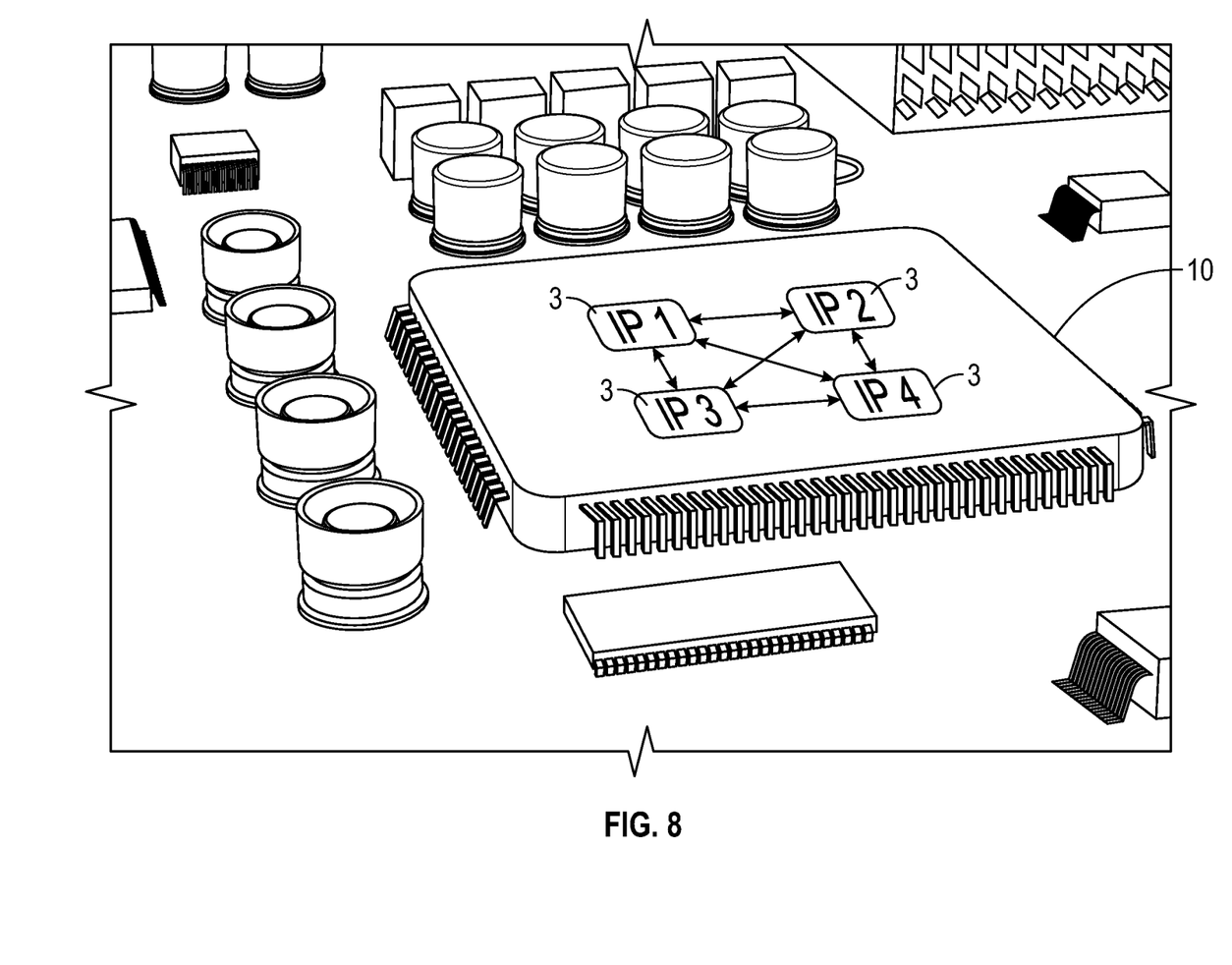
FIG. 8 is a perspective view of an electronic circuit with IP blocks generated by exemplary systems and methods of automatically generating IP blocks in accordance with the present disclosure.
Figure 9:
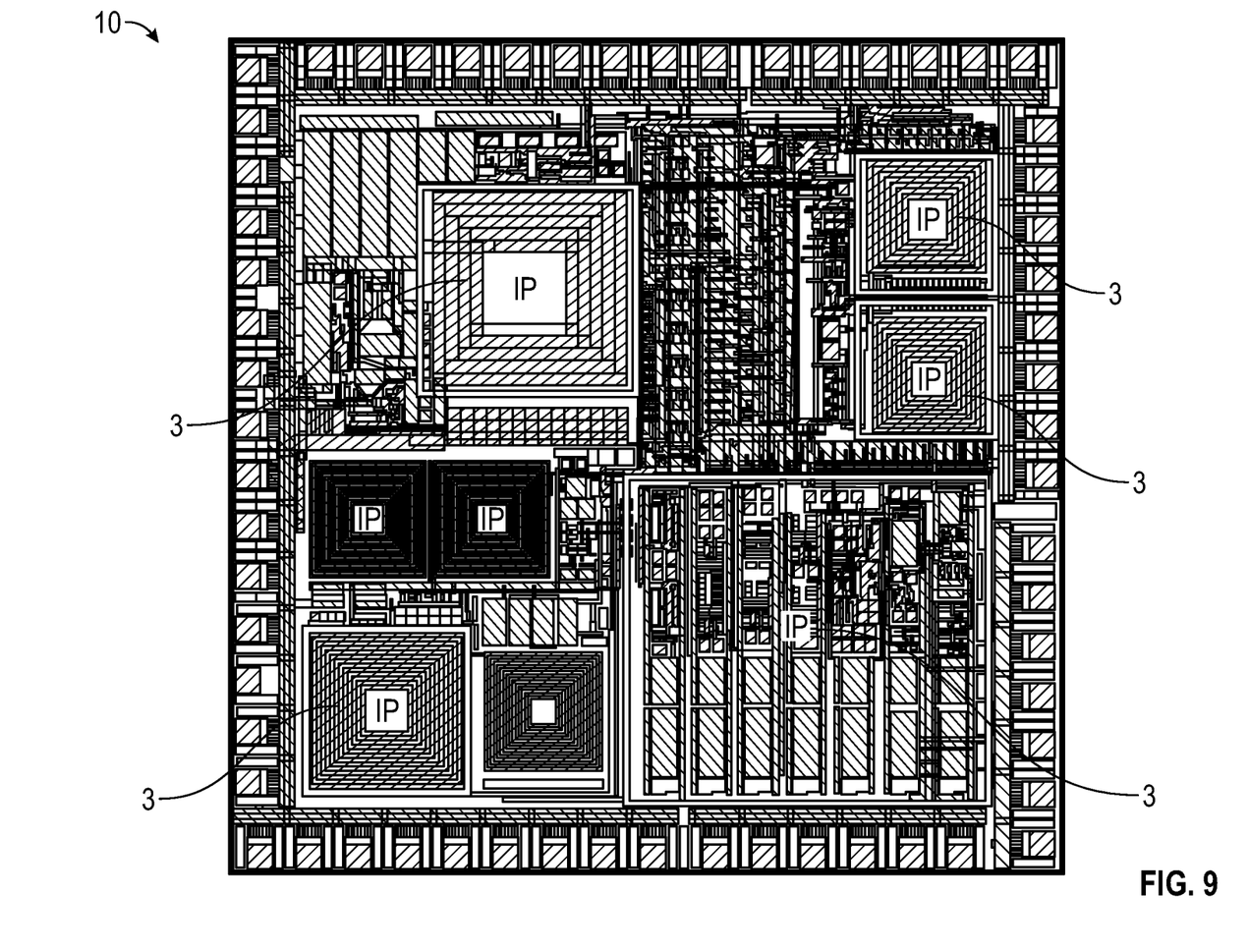
FIG. 9 is a perspective view of an electronic circuit with IP blocks generated by exemplary systems and methods of automatically generating IP blocks in accordance with the present disclosure.

The computer program may cause the IP generator 20 to delete the old circuit layout and generate a new IP layout by referencing the modified circuit schematic and the design rules. The new circuit's layout is automatically generated LVS, DRC, and DFM clean and compliant. Advantageously, exemplary embodiments work in an ECO (Engineering Change Order) mode, i.e., automatically accommodating interactive circuit changes during constructing the IP block 3 and making the changes in the layout block on-the-fly. As shown in FIGS. 8 and 9, the process yields an electronic circuit 10 with IPs 3 embedded in the microchip.

Thus, it is seen that systems and methods of generating an electronic circuit IP block are provided. It should be understood that any of the foregoing configurations and specialized components or connections may be interchangeably used with any of the systems and/or methods of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A computer-implemented method of automatically generating an electronic circuit IP block, comprising:
obtaining manufacturing processes and design rules from an external source;
defining an electronic circuit to be fabricated;
preparing a circuit schematic of the defined electronic circuit, the circuit schematic containing electrical information and constraints corresponding to the defined electronic circuit; and
generating an IP block for the defined electronic circuit based on the circuit schematic, the IP block being compliant with the manufacturing processes, design rules, electrical information, and constraints.

2. The computer-implemented method of claim 1, wherein the external source is a netlist or external constraints file.

3. The computer-implemented method of claim 1, further comprising providing an option to modify the IP block.

4. The computer-implemented method of claim 3, further comprising executing one or more modifications to the defined electronic circuit and modifying the IP block according to the one or more modifications.

5. The computer-implemented method of claim 1, further comprising validating the IP block.

6. The computer-implemented method of claim 1, wherein the defined electronic circuit is an existing electronic circuit or a new electronic circuit.

7. The computer-implemented method of claim 1, wherein the IP block is generated from one or both of: register-transfer level or hardware description language data.

8. A computer-implemented system for automatic generation of an electronic circuit IP block, comprising:
an electronic circuit layout generator in communication with one or more external sources; and
a computer program generator in communication with the electronic circuit layout generator;
wherein the electronic circuit layout generator receives from the one or more external sources manufacturing processes, design rules, electrical connectivity information and constraints, and a circuit schematic of a defined electronic circuit to be fabricated;
wherein the electronic circuit layout generator generates an IP block for the defined electronic circuit based on the circuit schematic, the IP block being compliant with the manufacturing processes, design rules, and electrical connectivity information and constraints; and
wherein the computer program generator creates the defined electronic circuit.

9. The computer-implemented system of claim 8, further comprising an artificial intelligence unit such that the electronic circuit layout generator uses machine learning to generate the IP block.

10. The computer-implemented system of claim 9, wherein the electronic circuit layout generator uses machine learning to supervise electrical connectivity correctness of the IP block.

11. The computer-implemented system of claim 8, wherein the defined electronic circuit is one or more of: LVS clean, DRC clean, DFM compliant, and RV compliant.

12. The computer-implemented system of claim 8, wherein the one or more external sources comprise a netlist or external constraints file.

13. A computer-implemented system for generating an electronic circuit IP block, comprising:
a processor;
a computer-readable storage medium in communication with the processor, the computer readable storage medium containing processing instructions;
the processing instructions providing for selection of manufacturing processes, design rules, electrical connectivity information and constraints, and a circuit schematic of a defined electronic circuit to be fabricated; and the processing instructions providing for generation of an IP block for the defined electronic circuit based on the circuit schematic, the IP block being compliant with the manufacturing processes, design rules, and electrical connectivity information and constraints.

14. The computer-implemented system of claim 13, further comprising an electronic circuit layout generator in communication with the processor and one or more external sources, the electronic circuit layout generator generating an IP block for the defined electronic circuit based on the circuit schematic; and a computer program generator in communication with the electronic circuit layout generator, the computer program generator creating the defined electronic circuit.

15. The computer-implemented system of claim 13, wherein the processing instructions provide for modification or re-creation of electronic circuit layout based on a circuit schematic or circuit architecture modifications provided to the system by a user.

16. The computer-implemented system of claim 14, further comprising an artificial intelligence unit such that the electronic circuit layout generator uses machine learning to generate the IP block.

17. The computer-implemented system of claim 14, wherein the electronic circuit layout generator can operate in an engineering change order mode to accommodate interactive circuit changes during generation of the IP block.

18. The computer-implemented system of claim 14, wherein the electronic circuit layout generator generates the IP block to accommodate a PINS floorplan.

19. The computer-implemented system of claim 14, wherein the electronic circuit layout generator generates the IP block by one or both of: flat and hierarchical design.

20. The computer-implemented system of claim 13, further comprising an IP generator in communication with the processor and one or more external sources, the IP generator generating an IP block for the defined electronic circuit based on the circuit schematic; and a computer program generator in communication with the IP generator, the computer program generator creating the defined electronic circuit.

* * * * *